United States Patent [19]

Hansen

[11] 4,046,212
[45] Sept. 6, 1977

[54] STEERABLE FRONT WHEEL DRIVE TRANSMITTING MECHANISM

[75] Inventor: Kai H. Hansen, Birmingham, Mich.

[73] Assignee: General Motors Corporation, Detroit, Mich.

[21] Appl. No.: 656,115

[22] Filed: Feb. 9, 1976

[51] Int. Cl.² .............................................. B60K 17/30
[52] U.S. Cl. ................................ 180/44 R; 180/43 B; 280/666
[58] Field of Search ................. 180/43 R, 43 A, 43 B, 180/44; 280/660, 661, 663, 664, 665, 666, 667

[56] References Cited

U.S. PATENT DOCUMENTS

| | | | |
|---|---|---|---|
| 1,027,137 | 5/1912 | Mayer | 180/43 R |
| 1,218,613 | 3/1917 | Adler | 180/43 R |
| 1,244,512 | 10/1917 | Ledbetter | 180/44 R |
| 1,273,519 | 7/1918 | Millington | 180/44 R |
| 1,474,198 | 11/1923 | Loe | 180/43 R X |
| 2,069,420 | 2/1937 | Paton | 280/662 X |
| 2,202,665 | 5/1940 | Metz | 280/663 |
| 2,608,260 | 8/1952 | Johnson | 280/666 X |
| 3,262,512 | 7/1966 | O'Brien | 180/44 R |
| 3,948,336 | 4/1976 | DeFusco | 180/43 R |

FOREIGN PATENT DOCUMENTS 326,868   3/1930   United Kingdom .............. 180/43 R

*Primary Examiner*—John P. Silverstrim
*Attorney, Agent, or Firm*—John P. Moran

[57] ABSTRACT

The presently disclosed mechanism is used on a vehicle having front wheels steerably mounted on a support member which is suspended from the frame of the vehicle. A drive-transfer case is centrally located on the frame and angle-drive cases are mounted on the support member. A two section drive shaft, interconnected by a universal joint drivingly connects the output of the transfer case with each input of the angle-drive cases. The forward section of the drive shaft is encased in a tubular torque reaction member which is rigidly fixed to the angle-drive case. A bracket and an arcuate-shaped arm connect the reaction member to the frame for pivotal movement about the axis of the universal joint. A shock absorber is mounted between a retainer secured to the frame and flange means formed on one of the angle-drive case and the steering knuckle support rearwardly of the steering axis and the upper control arm.

3 Claims, 5 Drawing Figures

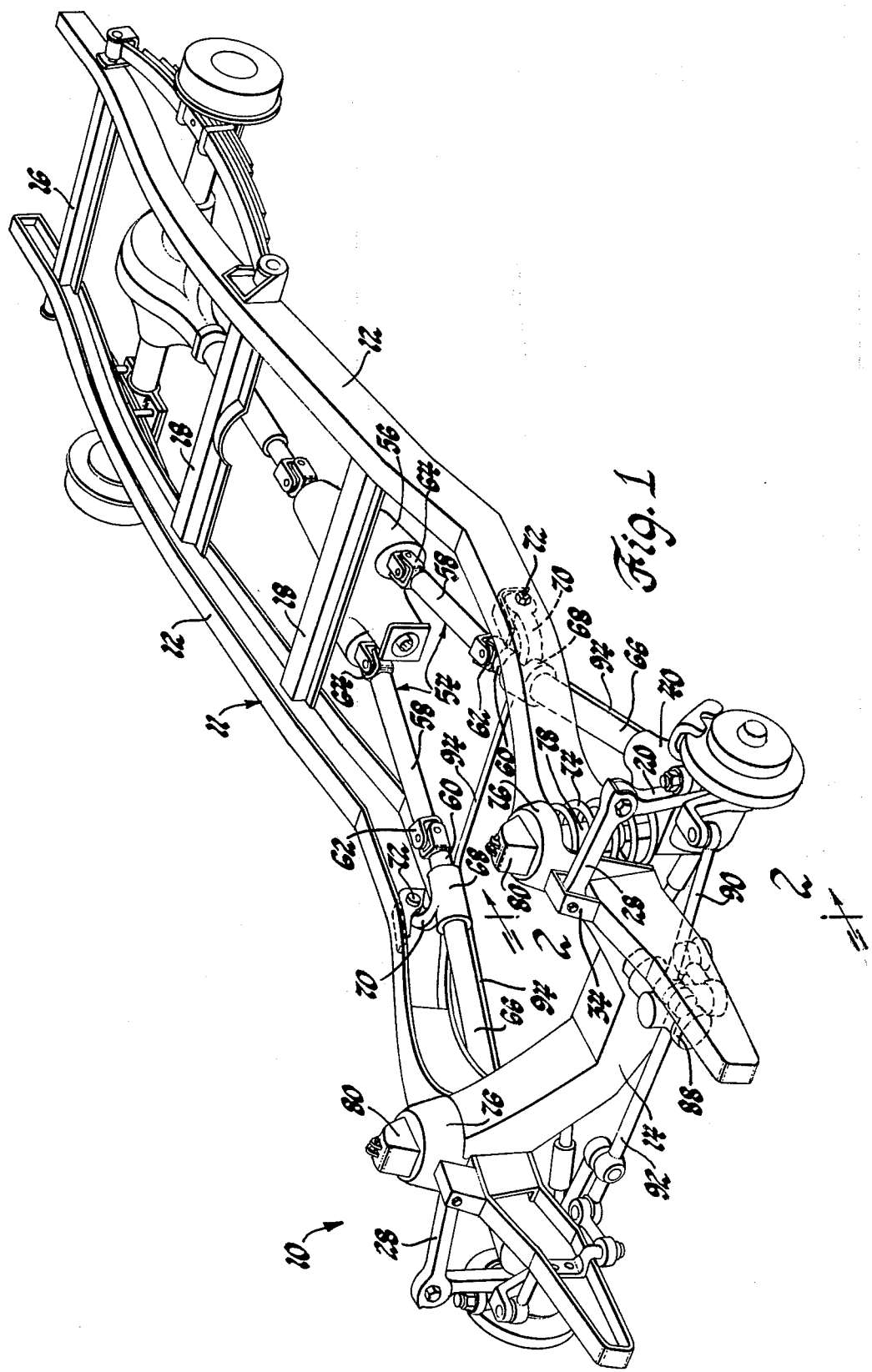

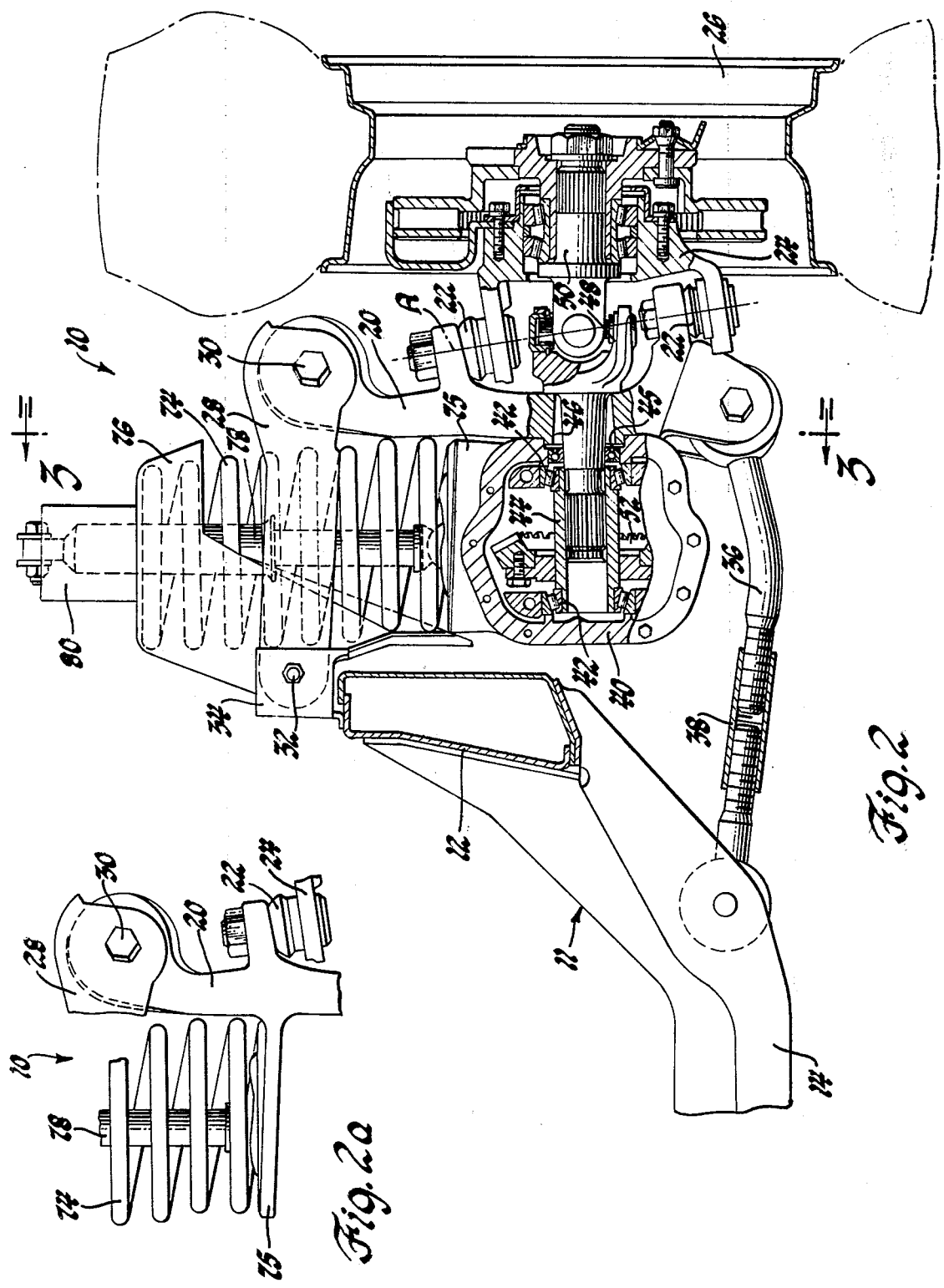

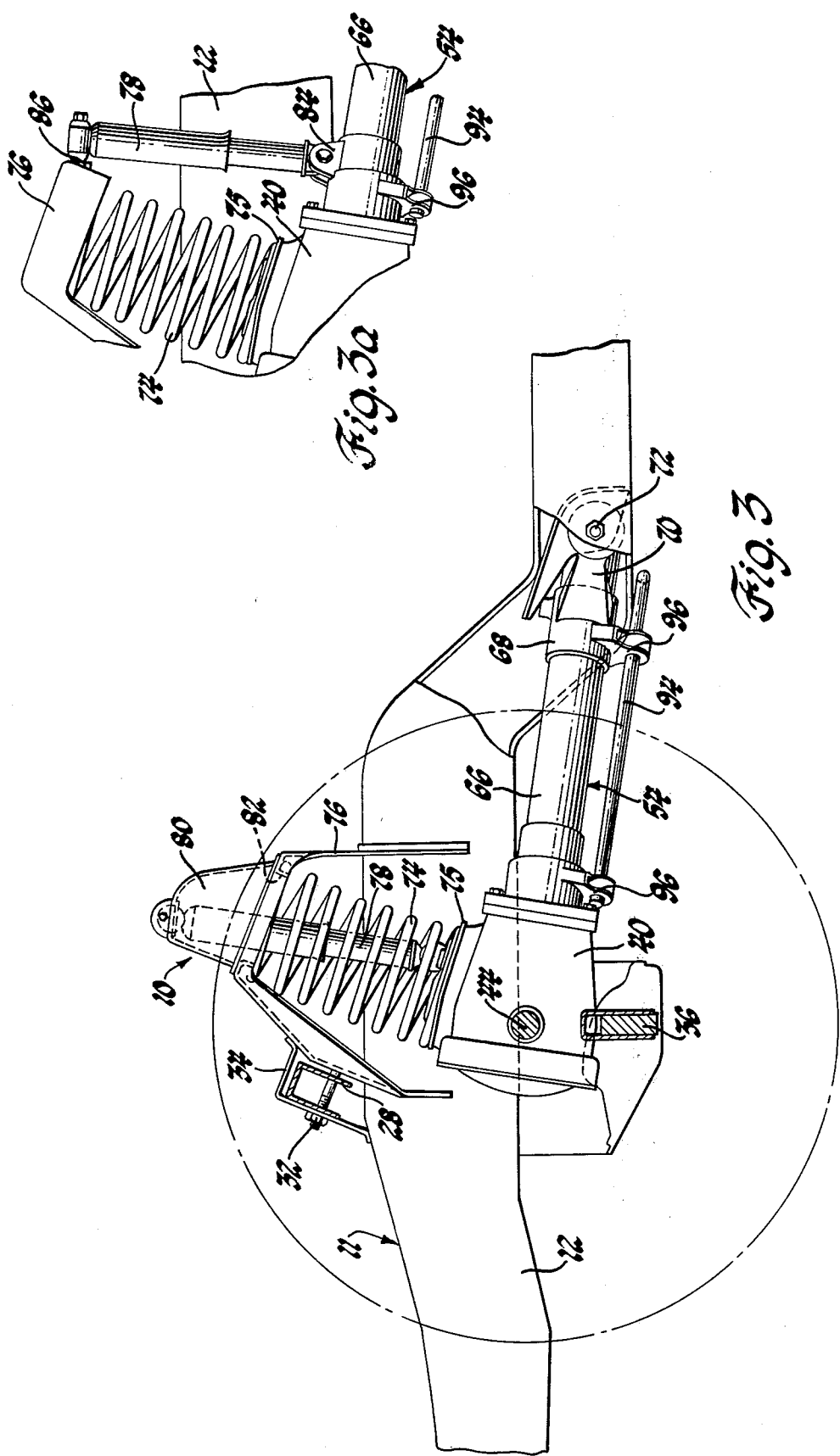

STEERABLE FRONT WHEEL DRIVE TRANSMITTING MECHANISM

This invention relates generally to vehicle suspension systems and, more particularly, to an improved independent front suspension system particularly adapted for front wheel or four wheel drive applications.

In designing a vehicle suspension system, automotive engineers evaluate the expected usage of the proposed vehicle and then design a suspension system which is most suitable for that usage. For example, when evaluating the expected usage of an off-highway or recreational vehicle, it can be expected that such a vehicle will be driven over terrain requiring maximum tractive effort from all four wheels of the vehicle. Such terrain may, of course, include numerous projections and depressions. In addition, however, it is to be expected that the vehicle will also be operated on conventional paved roads. Each of these expectations dictates that the vehicle suspension system embody certain desirable characteristics. In particular, a rough terrain expectation dictates that the suspension system provide maximum ground clearance at the front of the vehicle, and that it be readily adaptable to a front wheel driving arrangement. Further, a normal highway operation expectation dictates that the suspension system must provide ride and handling characteristics substantially comparable to an ordinary passenger conveying automobile.

Accordingly, an object of the invention is to provide an improved suspension system which combines in a relatively simple and economical arrangement a plurality of elements which provide all the requirements for rough terrain conditions as well as conventional highway operations.

Another object of the invention is to provide an improved independent wheel suspension system for the front steerable road wheels of an automotive vehicle.

A further object of the invention is to provide an improved independent wheel suspension system particularly adapted for front wheel drive applications.

A still further object of the invention is to provide a suspension system which includes a "V" drive arrangement wherein the drive shafts extend from a centrally located drive-transfer case to oppositely disposed, front mounted angle-drive cases, each shaft including two sections interconnected by a universal joint, the forward section being encased in a tubular member whose rear portion is pivotally connected to the vehicular side rail.

Still another object of the invention is to provide a suspension system including a centrally located drive-transfer case and front mounted, oppositely disposed angle-drive cases, with operatively interconnecting V-shaped drive shafts extending therebetween, each shaft being in two sections, interconnected by a universal joint, the forward section being encased in a tubular member pivotally connected at the rear end thereof to the vehicular side rail and fixedly secured at the front end thereof to an inner surface of the angle-drive case, upper and lower control arms pivotally mounted between respective upper and lower portions of the support member and portions of the vehicle frame, and a coil spring and shock absorber mounted between an upper surface of the angle-drive case and a retainer cup secured to the side rail, the shock absorber being mounted either inside of or directly behind the coil spring.

These and other objects and advantages of the invention will be apparent when reference is made to the following description and accompanying drawings, wherein:

FIG. 1 is a perspective view of an automotive frame embodying the inventive suspension system;

FIG. 2 is an enlarged fragmentary front view taken along the plane of the line 2—2 of FIG. 1, and looking in the direction of the arrows;

FIG. 2a is a fragmentary view illustrating an alternate embodiment of a portion of the FIG. 2 structure;

FIG. 3 is a side view taken along the plane of line 3—3 of FIG. 2, and looking in the direction of the arrows; and FIG. 3a is a fragmentary view illustrating an alternate embodiment of a portion of the FIG. 3 structure.

Referring now to the drawings in greater detail, FIGS. 1-3 illustrate a front suspension system 10 associated with an automotive frame 11 having oppositely disposed longitudinal side members 12, respective front and rear cross-members 14 and 16, and one or more intermediate cross-members 18.

The suspension system 10 includes a vertically disposed support member 20 (FIG. 2), defining the wheel steering axis designated by the letter A and pivotally secured by ball joints 22 to a steering knuckle 24 on which each front road wheel 26 is rotatably mounted.

A laterally extending upper control arm or link 28 is pivotally connected at one end thereof by suitable pivot means 30 to each support member 20, and at the other end thereof by a pivot pin 32 to a bracket 34 formed on the top surface of a forward portion of each frame side member 12. A laterally extending lower control arm or link 36 is pivotally connected between each support member 20 and the adjacent end portion of the front cross-member 14. A length-adjusting sleeve 38 is threadedly mounted at an intermediate point along each lower control arm 36. Suitable rubber bushing means (not shown) are employed at each end of each of the upper and lower control arms or links 28 and 36, respectively, for wear control and isolation advantage.

An angle-drive case 40 is secured by bolts (not shown) to an inner vertical surface of the support member 20. The angle-drive case 40 houses a pair of spaced-apart bearings 42 supporting the end portion of a drive shaft 44 extend through aligned openings 45 and 46 formed in the angle-drive case 40 and the support member 20, respectively. A universal joint 48 connects the exposed end of the shaft 44 to a drive spindle 50 on which the steering knuckle 24 is mounted. A bevel gear 52 is mounted on the drive shaft 44 within the angle-drive case 40, and is driven by a mating gear (not shown) mounted on the forward end of a shaft 54 (FIG. 3) extending from a suitable drive mechanism such as a centrally located four-wheel drive-transfer case 56 (FIG. 1). As may be noted in FIG. 1, the shaft 54 includes two sections 58 and 60 interconnected by a universal joint 62, with the rear end of the rear section 58 connected by another universal joint 64 to the drive-transfer case 56. The forward section 60 is rotatably mounted in a tubular member 66, the latter being supported by a bracket 68 adjacent the universal joint 62, the bracket 68 including a short arm portion 70 pivotally supported by a pivot pin 72 to the adjacent portion of the side rail 12. The axis of the pivot pin 72 is aligned with a transverse line through the center of the universal joint 62.

A coil spring 74 is mounted between a flange 75 formed on the upper surface of the angle-drive case 40 and a retainer cup 76 secured to the forward portion of the side rail 12. It should be realized that a different springing medium could be employed in lieu of the coil spring 74, for example, a torsion bar (not shown) operatively connected between the frame and one of the lower control arm 36, the upper control arm 28, or the angle-drive case 40. If desired, the flange 75 for supporting the coil spring 74 could be formed on the support member 20 (FIG. 2a) to extend across the top surface of the angle-drive case 40.

A shock absorber 78 is mounted within the coil spring 74, between the upper surface of the angle-drive case 40, or the flange (not shown), and a bracket 80 secured to the upper surface of the retainer cup 76, the shock absorber 78 extending through an opening 82 formed in such upper surface. If desired, the shock absorber 78 could be mounted directly behind the coil spring 74 between suitable support brackets 84 and 86 (FIG. 3a) formed on the rear portion of the angle-drive case 40 and the upper portion of the retainer cup 76, respectively.

Suitable steering mechanism 88 and associated steering linkage 90 and 92 are operatively connected between a forward portion of the side member 12 and the two front wheels 26. A substantially U-shaped stabilizer bar 94 is secured to front and rear portions of the tubular member 66 by suitable brackets or clamps 96.

With the arrangement just described, the pivotally mounted tubular member 66 encasing the forward shaft section serves as a torque-reaction arm or torque tube for relieving a substantial portion of the brake torque reaction from the front cross-member 14, as compared to prior arrangements.

From the foregoing and from the illustrations of FIGS. 1 and 2, it may be realized by those skilled in the art that the arrangement of the interconnected shafts 58 and 60 and the spring supporting angle-drive case 40 provides a relatively high front ground clearance, ideal for recreational-type vehicles. It is apparent that such arrangement also provides a clear area along the spindle axis for the attachment of front wheel drive components, while permitting pivotal movement in a suspension mode and lateral tilting and displacement in a steering mode.

Additionally, the inventive suspension system is lighter and more compact, and provides more tire turn clearance, than is the case with prior designs, while eliminating any interference with the vehicular underbody in the vicinity of the accelerator and brake pedal components.

While but two embodiments of the invention have been shown and described, other modifications thereof are possible.

What is claimed is:

1. In a vehicle having a sprung mass portion including a vehicular frame, and an unsprung mass portion including steerable road wheels, each of said wheels being drivingly attached to a drive spindle rotatably supported on a steering knuckle, a suspension system for said steerable road wheel comprising a steering knuckle support member including a vertical extension, said steering knuckle being pivotally connected to said steering knuckle support member so as to define a generally vertically-oriented steering axis therewith, an upper laterally extending control arm pivotally connected at the ends thereof between said frame and said vertical extension of said steering knuckle support member, a lower laterally extending control arm pivotally connected at the ends thereof between said frame and said steering knuckle support member, a drive-transfer case centrally disposed on said sprung mass portion, an angle-drive case rigidly attached to an inner surface of said steering knuckle support member, aligned openings formed in said angle-drive case and said steering knuckle support member, a drive shaft rotatably supported in said angle-drive case and extending therefrom through said aligned openings, a first universal joint located on said vertically-oriented steering axis operatively interconnecting said drive shaft and said drive spindle, bevel gear means formed on said drive shaft within said angle-drive case, a two-section drive transfer shaft interconnected by a second universal joint intermediate the overall length thereof, the rear section thereof being operatively connected by a third universal joint to said drive-transfer case, and the forward section thereof being operatively connected to said bevel gear means in said angle-drive case for effecting driving rotation of said steerable road wheel via said drive shaft, a tubular torque reaction member encasing said forward section of said two-section drive transfer shaft and secured at the forward end thereof to said angle-drive case, a bracket secured adjacent the rear end of said forward section, an arcuate-shaped arm fixedly secured at one end thereof to said bracket and pivotally secured at the other end thereof by pivot pin means to said side rail, the axis of said pivot pin means extending through the center of said second universal joint, a retainer cup fixedly secured to said frame, and a shock absorber disposed between said retainer cup and flange means formed on one of said angle-drive case and said steering knuckle support member rearwardly of said vertically oriented steering axis and rearwardly of said upper control arm for effecting primary suspension of said sprung mass portion relative to said unsprung mass portion.

2. In a vehicle having a sprung mass portion including a vehicular frame, and an unsprung mass portion including steerable road wheels, each of said wheels being drivingly attached to a drive spindle rotatably supported on a steering knuckle, a suspension system for said steerable road wheel comprising a steering knuckle support member including a vertical extension, said steering knuckle being pivotally connected to said steering knuckle support member so as to define a generally vertically-oriented steering axis therewith, an upper laterally extending control arm pivotally connected at the ends thereof between said frame and said vertical extension of said steering knuckle support member, a lower laterally extending control arm pivotally connected at the ends thereof between said frame and said steering knuckle support member, a drive-transfer case centrally disposed on said sprung mass portion, an angle-drive case rigidly attached to an inner surface of said steering knuckle support member, aligned openings formed in said angle-drive case and said steering knuckle support member, a drive shaft rotatably supported in said angle-drive case and extending therefrom through said aligned openings, a first universal joint located on said vertically-oriented steering axis operatively interconnecting said drive shaft and said drive spindle, bevel gear means formed on said drive shaft within said angle-drive case, a two-section drive transfer shaft interconnected by a second universal joint intermediate the overall length thereof and operatively connected between said drive-transfer case and said bevel gear means in said angle-drive case for effecting driving rotation of said steerable road wheel via said drive shaft, a tubular torque reaction member encasing the forward section of said two-section drive transfer shaft and secured at the forward end thereof to said angle-drive case, a bracket secured adjacent the rear end of said forward section, an arcuate-shaped arm fixedly secured at one end thereof to said bracket and pivotally secured at the other end thereof by pivot pin means to said side rail, the axis of said pivot pin means extending through the center of said second universal joint, a retainer cup fixedly secured to said frame, and a coil spring and a shock absorber disposed between said retainer cup and flange means formed on said angle-drive case rearwardly of said vertically-oriented steering axis and rearwardly of said upper control arm for effecting primary suspension of said sprung mass portion relative to said unsprung mass portion.

3. In a vehicle having a sprung mass portion including a vehicular frame, and an unsprung mass portion including steerable road wheels, each of said wheels being drivingly attached to a drive spindle rotatably supported on a steering knuckle, a suspension system for said steerable road wheel comprising a steering knuckle support member including a vertical extension, said steering knuckle being pivotally connected to said steering knuckle support member so as to define a generally vertically-oriented steering axis therewith, an upper laterally extending control arm pivotally connected at the ends thereof between said frame and said control vertical extension of said steering knuckle support member, a lower laterally extending control arm pivotally connected at the ends thereof between said frame and said steering knuckle support member, a drive-transfer case centrally disposed on said sprung mass portion, an angle-drive case rigidly attached to an inner surface of said steering knuckle support member, aligned openings formed in said angle-drive case and said steering knuckle support member, a drive shaft rotatably supported in said angle-drive case and extending therefrom through said aligned openings, a first universal joint located on said vertically-oriented steering axis operatively interconnecting said drive shaft and said drive spindle, bevel gear means formed on said drive shaft within said angle-drive case, a two-section drive transfer shaft interconnected by a second universal joint intermediate the overall length thereof, the rear section thereof being operatively connected by a third universal joint to said drive-transfer case, and the forward section thereof being operatively connected to said bevel gear means in said angle-drive case for effecting driving rotation of said steerable road wheel via said drive shaft, a tubular torque reaction member encasing said forward section of said two-section drive transfer shaft and secured at the forward end thereof to said angle-drive case, a bracket secured adjacent the rear end of said forward section, an arcuate-shaped arm fixedly secured at one end thereof to said bracket and pivotally secured at the other end thereof by pivot pin means to said side rail, the axis of said pivot pin means extending through the center of said second universal joint, a retainer cup fixedly secured to said frame, and a coil spring and a shock absorber disposed between said retainer cup and flange means formed on said steering knuckle support member rearwardly of said vertically-oriented steering axis and rearwardly of said upper control arm for effecting primary suspension of said sprung mass portion relative to said unsprung mass portion.

* * * * *

UNITED STATES PATENT AND TRADEMARK OFFICE
CERTIFICATE OF CORRECTION

PATENT NO. : 4,046,212
DATED : September 6, 1977
INVENTOR(S) : Kai H. Hansen

It is certified that error appears in the above-identified patent and that said Letters Patent are hereby corrected as shown below:

Claim 3, Column 5, line 31, after "said" delete -- control --.

Signed and Sealed this

Sixteenth Day of May 1978

[SEAL]

Attest:

RUTH C. MASON
Attesting Officer

LUTRELLE F. PARKER
Acting Commissioner of Patents and Trademarks